US012665255B2

(12) United States Patent
Zhu et al.

(10) Patent No.: US 12,665,255 B2
(45) Date of Patent: Jun. 23, 2026

(54) END CAP ASSEMBLY, BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Jianping Zhu, Ningde City (CN); Xiaoxi Zhang, Ningde City (CN); Haibo Ke, Ningde City (CN); Heng Chen, Ningde City (CN); Junqi Cao, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 627 days.

(21) Appl. No.: 18/297,645

(22) Filed: Apr. 10, 2023

(65) Prior Publication Data

US 2023/0246287 A1 Aug. 3, 2023

Related U.S. Application Data

(63) Continuation of application No. PCT/CN2021/096953, filed on May 28, 2021.

(51) Int. Cl.
| | |
|---|---|
| *H01M 50/342* | (2021.01) |
| *H01M 50/103* | (2021.01) |
| *H01M 50/15* | (2021.01) |

(52) U.S. Cl.
CPC ..... *H01M 50/3425* (2021.01); *H01M 50/103* (2021.01); *H01M 50/15* (2021.01)

(58) Field of Classification Search
CPC ........... H01M 50/3425; H01M 50/103; H01M 50/15; H01M 50/317; H01M 50/375;
(Continued)

(56) References Cited

U.S. PATENT DOCUMENTS

2023/0059831 A1* 2/2023 Yang .................. H01M 50/148

FOREIGN PATENT DOCUMENTS

| CN | 102208581 A | 10/2011 |
| CN | 203536491 U | * 4/2014 |
(Continued)

OTHER PUBLICATIONS

International Search Report received in the corresponding International Application PCT/CN2021/096953, mailed Jan. 24, 2022.
(Continued)

*Primary Examiner* — Daniel S Gatewood
(74) *Attorney, Agent, or Firm* — K&L Gates LLP

(57) ABSTRACT

An end cap assembly, a battery cell, a battery, an electrical device, and a method and device for manufacturing a battery cell are provided. The end cap assembly includes an end cap and a pressure relief mechanism. The pressure relief mechanism is connected to the end cap. The pressure relief mechanism is configured to: keep in a first pressure relief state when an internal pressure or temperature of the battery cell is greater than or equal to a first threshold and less than a second threshold, so as to release the internal pressure of the battery cell; and keep in a second pressure relief state when the internal pressure or temperature of the battery cell is greater than or equal to the second threshold, so as to release the internal pressure of the battery cell.

20 Claims, 10 Drawing Sheets

(58) Field of Classification Search
  CPC .. H01M 50/342; H01M 10/058; H01M 10/04;
                          H01M 10/0404; Y02E 60/10
  See application file for complete search history.

(56) References Cited

FOREIGN PATENT DOCUMENTS

| | | | | | |
|---|---|---|---|---|---|
| CN | 111933833 | A | | 11/2020 | |
| CN | 212033118 | U | * | 11/2020 | |
| CN | 112018301 | A | | 12/2020 | |
| CN | 112713345 | A | | 4/2021 | |
| CN | 112736363 | A | * | 4/2021 | ........ H01M 10/0404 |
| CN | 213026308 | U | | 4/2021 | |
| JP | H0737568 | A | | 2/1995 | |
| JP | H09120811 | A | | 5/1997 | |
| JP | 2003297324 | A | | 10/2003 | |
| WO | 03044397 | A1 | | 5/2003 | |

OTHER PUBLICATIONS

Written Opinion received in the corresponding International Application PCT/CN2021/096953, mailed Jan. 24, 2022.
The First Office Action received in the counterpart Chinese Application 202180057235.2, Issued on Apr. 16, 2024.
Decision to Grant a Patent received in the counterpart Japanese Application 2022-563083, mailed on Jun. 4, 2024.
The extended European Search Report received in the corresponding European Application 21936252.2, mailed Jun. 15, 2023.
Notice of Reasons for Refusal received in the corresponding Japanese Application 2022-563083, mailed Nov. 21, 2023.

* cited by examiner

END CAP ASSEMBLY, BATTERY CELL, BATTERY, AND ELECTRICAL DEVICE

CROSS-REFERENCE TO RELATED APPLICATIONS

This application is a continuation of International Application PCT/CN2021/096953, filed May 28, 2021 and entitled "END CAP ASSEMBLY, BATTERY CELL, BATTERY, AND ELECTRICAL DEVICE", which is incorporated herein by reference in its entirety.

TECHNICAL FIELD

This application relates to the technical field of batteries, and in particular, to an end cap assembly, a battery cell, a battery, an electrical device, and a method and device for manufacturing a battery cell.

BACKGROUND

By virtue of outstanding advantages such as a high energy density and high cycle performance, lithium-ion secondary batteries have become mainstream products of secondary batteries, and are widely used in many fields such as portable electrical devices, powered vehicles, mobile phones, and spacecraft.

A battery cell generally includes a shell, an end cap assembly, and an electrode assembly. The end cap assembly fits on and covers the shell to provide an airtight space for the electrode assembly and an electrolytic solution. Electrical energy of the electrode assembly can be output from the shell through electrode terminals on the end cap assembly.

To ensure safety performance of the battery, a pressure relief mechanism is generally disposed in the end cap assembly, and the pressure relief mechanism can release pressure inside the battery when an internal pressure or temperature of the battery reaches a threshold. Whether pressure relief mechanism can effectively relieve pressure affects safety performance of the battery directly. Therefore, how to ensure an effective pressure relief capability of the pressure relief mechanism is an urgent problem in the battery technology.

SUMMARY

Embodiments of this application provide an end cap assembly, a battery cell, a battery, an electrical device, and a method and device for manufacturing a battery cell to enhance safety performance of the battery.

According to a first aspect, an embodiment of this application provides an end cap assembly, applicable to a battery cell and including an end cap and a pressure relief mechanism. The pressure relief mechanism is connected to the end cap. The pressure relief mechanism is configured to: keep in a first pressure relief state when an internal pressure or temperature of the battery cell is greater than or equal to a first threshold and less than a second threshold, so as to release the internal pressure of the battery cell; and keep in a second pressure relief state when the internal pressure or temperature of the battery cell is greater than or equal to the second threshold, so as to release the internal pressure of the battery cell. A pressure relief area of the pressure relief mechanism in the first pressure relief state is smaller than a pressure relief area of the pressure relief mechanism in the second pressure relief state.

In the foregoing technical solution, the pressure relief mechanism can work in two pressure relief states. The two pressure relief states match different values of internal pressure or temperature of the battery cell. The pressure is relieved when the internal pressure or temperature of the battery cell reaches a threshold. Specifically, the pressure relief mechanism releases the internal pressure of the battery cell in the first pressure relief state when the internal pressure or temperature of the battery cell is greater than the first threshold and less than the second threshold, and the pressure relief mechanism releases the internal pressure of the battery cell in the second pressure relief state when the internal pressure or temperature of the battery cell is greater than the second threshold. The pressure relief area in the first pressure relief state is smaller than the pressure relief area in the second pressure relief state, that is, a pressure relief rate in the second pressure relief state is greater than a pressure relief rate in the first pressure relief state. Therefore, the pressure can be released rapidly when the internal pressure or temperature of the battery cell is relatively high, thereby improving the pressure relief capability and ensuring safety performance of the battery cell. The pressure relief rate of the pressure relief mechanism varies with the internal pressure or temperature of the battery cell, thereby ensuring the internal pressure of the battery cell to be constant at all times. In addition, the pressure relief mechanism does not need to reserve a gas storage space. Therefore, the pressure relief mechanism is prevented from occupying an internal space of the battery cell, and it is avoided that the pressure relief mechanism affects the energy density of the battery cell.

In some embodiments of the first aspect, the pressure relief mechanism includes a main body and an opening apparatus. The main body includes a pressure relief port. The opening apparatus is configured to open at least a part of the pressure relief port when the pressure relief mechanism is in the first pressure relief state or the second pressure relief state, so as to release the internal pressure of the battery cell through the pressure relief port. A pressure relief area at the pressure relief port in the first pressure relief state is smaller than a pressure relief area at the pressure relief port in the second pressure relief state.

In the foregoing technical solution, the pressure relief mechanism releases the internal pressure of the battery cell through the pressure relief port. When the pressure relief area at the pressure relief port in the first pressure relief state is smaller than the pressure relief area at the pressure relief port in the second pressure relief state, the opening apparatus can open the pressure relief port to a degree that varies with the value of internal pressure or temperature of the battery cell. In this way, the pressure relief mechanism releases the pressure at different pressure relief rates to ensure that the internal pressure of the battery cell is constant at all times.

In some embodiments in the first aspect of this application, the pressure relief port includes a first pressure relief port and a second pressure relief port that are independent of each other. The first pressure relief port is opened and the second pressure relief port is closed when the pressure relief mechanism is in the first pressure relief state. Both the first pressure relief port and the second pressure relief port are opened when the pressure relief mechanism is in the second pressure relief state.

In the foregoing technical solution, the pressure relief mechanism includes the first pressure relief port and the second pressure relief port that are independent of each other, thereby ensuring the structural strength of the pressure relief mechanism.

In some embodiments in the first aspect of this application, the opening apparatus includes a blocking piece. The blocking piece is connected to the main body. The blocking piece is configured to be stressed when the internal pressure or temperature of the battery cell is greater than or equal to the first threshold, so as to open at least a part of the pressure relief port.

In the foregoing technical solution, the blocking piece is stressed when the internal pressure or temperature of the battery cell is greater than or equal to the first threshold, so as to open at least a part of the pressure relief port; and is restored to a former state when the internal pressure or temperature of the battery cell is less than the first threshold, so as to block the pressure relief port. In this way, the pressure relief mechanism implements pressure relief and blocking in time.

In some embodiments in the first aspect of this application, the opening apparatus further includes an extruding piece. The extruding piece is movably disposed on the main body. The extruding piece is configured to move against the main body when the internal pressure or temperature of the battery cell is greater than or equal to the first threshold, so that the blocking piece is compressed under a force to open at least a part of the pressure relief port.

In the foregoing technical solution, the blocking piece is compressed by the movement of the extruding piece so that the blocking piece can open the pressure relief port to release pressure. With the extruding piece disposed, the blocking piece can be compressed effectively when the internal pressure or temperature of the battery cell is greater than the first threshold, so as to open the pressure relief port to release pressure. In addition, the blocking piece is evenly stressed during the compression.

In some embodiments in the first aspect of this application, the main body includes an abutting portion. The extruding piece is closer to an interior of the battery cell than the abutting portion. The abutting portion is configured to coordinate with the extruding piece to extrude the blocking piece when the internal pressure or temperature of the battery cell is greater than or equal to the first threshold, so that the blocking piece is compressed under a force to open at least a part of the pressure relief port.

In the foregoing technical solution, the abutting piece and the extruding piece coordinate to extrude the blocking piece when the internal pressure or temperature of the battery cell is greater than or equal to the first threshold, so that the blocking piece is compressed under a force to open at least a part of the pressure relief port; and are restored to a former state when the internal pressure or temperature of the battery cell is less than the first threshold, so as to block the pressure relief port. In this way, the pressure relief mechanism implements pressure relief and blocking in time.

In some embodiments in the first aspect of this application, the main body further includes a position limiting portion. The position limiting portion is disposed around the abutting portion. The position limiting portion and the abutting portion jointly define an accommodation cavity. The accommodation cavity is configured to accommodate the extruding piece and the blocking piece.

In the foregoing technical solution, the positioning limiting portion and the abutting portion jointly define the accommodation cavity configured to accommodate the extruding piece and the blocking piece, thereby preventing the blocking piece and the extruding piece from being exposed in an external environment, avoiding wear and tear caused by the external environment to the blocking piece and the extruding piece, and extending the service life of the blocking piece and the extruding piece. In addition, because the position limiting portion is disposed around the abutting portion, the position limiting portion can further serve a guiding function when the extruding piece moves in the accommodation cavity.

In some embodiments in the first aspect of this application, a clearance exists between an inner wall of the position limiting portion and an outer wall of the extruding piece.

In the foregoing technical solution, a clearance exists between the inner wall of the position limiting portion and the outer wall of the extruding portion, thereby avoiding friction between the inner wall of the position limiting portion and the outer wall of the extruding piece due to contact. This not only avoids wear and tear of the position limiting portion and the extruding piece caused by the friction between the inner wall of the position limiting portion and the outer wall of the extruding piece, but also reduces a resistance of movement of the extruding piece against the main body. In this way, when the internal pressure or temperature of the battery cell is greater than or equal to the first threshold, the extruding piece can move smoothly and compress the blocking piece to open the pressure relief port to release pressure. When the internal pressure or temperature of the battery cell is less than the first threshold, the extruding piece can move smoothly and restore the blocking piece to a former state to block the pressure relief port, thereby ensuring the safety performance of the battery cell.

In some embodiments in the first aspect of this application, the pressure relief port is disposed in the position limiting portion.

In the foregoing technical solution, the pressure relief port is disposed on the position limiting portion, so that the pressure relief port is located on a compression path of the blocking piece so as to be conveniently openable.

In some embodiments in the first aspect of this application, the main body further includes a position limiting structure. The position limiting structure is configured to support the extruding piece so that the extruding piece is prevented from moving toward an interior of the battery cell.

In the foregoing technical solution, the position limiting structure can provide support for the extruding piece and keep the extruding piece in a reasonable position, so as to prevent the extruding piece from moving excessively toward the battery cell when the internal pressure or temperature of the battery cell is less than the first threshold.

In some embodiments in the first aspect of this application, the position limiting structure is an annular structure.

In the foregoing technical solution, the annular position limiting structure can support the extruding piece more effectively.

In some embodiments in the first aspect of this application, the first pressure relief port is closer to an interior of the battery cell than the second pressure relief port.

In the foregoing technical solution, the amount of compression of the blocking piece varies with the internal pressure or temperature of the battery cell. When the amount of compression of the blocking piece is relatively small, a part or all of just the first pressure relief port closer to the interior of the battery cell can be opened. When the amount of compression of the blocking piece increases, the first pressure relief port can be fully opened and a part or all of the second pressure relief port farther away from the interior of the battery cell can be opened. In this way, the pressure relief area varies between the two pressure relief states, thereby making it convenient for the pressure relief mechanism to change over between the two pressure relief states.

In some embodiments in the first aspect of this application, the end cap includes a recessed portion that is recessed toward an interior of the battery cell. The recessed portion is configured to accommodate at least a part of the pressure relief mechanism.

In the foregoing technical solution, a recessed portion configured to accommodate at least a part of the pressure relief mechanism is disposed on the end cap, thereby reducing the structural size of the battery cell and reducing space occupation of the battery cell.

According to a second aspect, an embodiment of this application provides a battery cell. The battery cell includes a shell, an electrode assembly, and the end cap assembly according to any embodiment in the first aspect of this application. An opening is made on the shell. The electrode assembly is accommodated in the shell. The end cap is configured to cover and seal the opening.

In the foregoing technical solution, the pressure relief mechanism of the battery cell is in either of two pressure relief states. The two pressure relief states match different pressures or temperatures inside the battery cell. The pressure is relieved when the internal pressure or temperature of the battery cell reaches a threshold. Specifically, the pressure relief mechanism releases the internal pressure of the battery cell in the first pressure relief state when the internal pressure or temperature of the battery cell is greater than the first threshold and less than the second threshold, and the pressure relief mechanism releases the internal pressure of the battery cell in the second pressure relief state when the internal pressure or temperature of the battery cell is greater than the second threshold. The pressure relief area in the first pressure relief state is smaller than the pressure relief area in the second pressure relief state, that is, a pressure relief rate in the second pressure relief state is greater than a pressure relief rate in the first pressure relief state. Therefore, the pressure can be released rapidly when the internal pressure of the battery cell is relatively high, thereby ensuring safety performance of the battery cell. The pressure relief rate of the pressure relief mechanism varies with the internal pressure or temperature of the battery cell, thereby ensuring the internal pressure of the battery cell to be constant at all times.

According to a third aspect, an embodiment of this application provides a battery, including a box and the battery cell according to any embodiment in the second aspect of this application.

In the foregoing technical solution, the pressure relief mechanism of the battery cell can work in two different pressure relief states, and can release pressure rapidly when the internal pressure of the battery cell is relatively high, thereby ensuring the safety performance of the battery cell, and in turn, ensuring the safety performance of the battery. The pressure relief rate of the pressure relief mechanism varies with the internal pressure or temperature of the battery cell, thereby ensuring the internal pressure of the battery cell to be constant at all times.

According to a fourth aspect, an embodiment of this application provides an electrical device, including the battery cell according to any embodiment in the second aspect of this application.

In the foregoing technical solution, the pressure relief mechanism of the battery cell in the electrical device can work in two different pressure relief states, and can release pressure rapidly when the internal pressure of the battery cell is relatively high, thereby ensuring the safety performance of the battery cell, and in turn, ensuring the safety of the electrical device. The pressure relief rate of the pressure relief mechanism varies with the internal pressure or temperature of the battery cell, thereby ensuring the internal pressure of the battery cell to be constant at all times.

According to a fifth aspect, some embodiments of this application provide a method for manufacturing a battery cell, including:

providing a shell, on which an opening is made;

providing an electrode assembly;

providing an end cap assembly, where the end cap assembly includes: an end cap; and a pressure relief mechanism, connected to the end cap, where the pressure relief mechanism is configured to: keep in a first pressure relief state when an internal pressure or temperature of the battery cell is greater than or equal to a first threshold and less than a second threshold, so as to release the internal pressure of the battery cell; and keep in a second pressure relief state when the internal pressure or temperature of the battery cell is greater than or equal to the second threshold, so as to release the internal pressure of the battery cell, where a pressure relief area of the pressure relief mechanism in the first pressure relief state is smaller than a pressure relief area of the pressure relief mechanism in the second pressure relief state; and letting the electrode assembly be accommodated in the shell, and closing the opening by using the end cap assembly.

According to a sixth aspect, an embodiment of this application provides a device for manufacturing a battery cell, including a providing apparatus and a mounting apparatus. The providing apparatus is configured to: provide a shell, on which an opening is made; provide an electrode assembly; and provide an end cap assembly. The end cap assembly includes: an end cap; and a pressure relief mechanism, connected to the end cap. The pressure relief mechanism is configured to: keep in a first pressure relief state when an internal pressure or temperature of the battery cell is greater than or equal to a first threshold and less than a second threshold, so as to release the internal pressure of the battery cell; and keep in a second pressure relief state when the internal pressure or temperature of the battery cell is greater than or equal to the second threshold, so as to release the internal pressure of the battery cell. A pressure relief area of the pressure relief mechanism in the first pressure relief state is smaller than a pressure relief area of the pressure relief mechanism in the second pressure relief state. The mounting apparatus is configured to let the electrode assembly be accommodated in the shell, and close the opening by using the end cap assembly.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
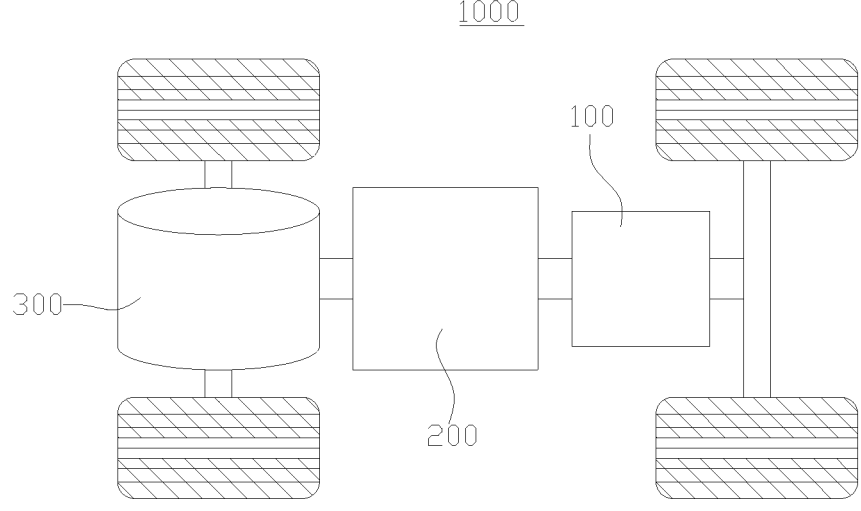
FIG. 1 is a schematic structural diagram of a vehicle according to some embodiments of this application.

Reference numerals: 1000—vehicle; 100—battery; 10—box; 11— accommodation space; 12—first part; 13—second part; 20—battery cell; 21—shell; 211—opening; 22—electrode assembly; 221—positive tab; 222—negative tab; 23— end cap assembly; 231—first electrode terminal; 232—second electrode terminal; 233—end cap; 2331—exhaust hole; 2332—recessed portion; 23321—sidewall; 23322—bottom wall; 23323—supporting portion; 234—pressure relief mechanism; 2341—main body; 23411—pressure relief port; 23412—first pressure relief port; 23413—second pressure relief port; 23414—abutting portion; 23415—position limiting portion; 23416—position limiting structure; 23417—connecting portion; 2342—opening apparatus; 23421—blocking piece; 23422—extruding piece; 235— accommodation cavity; 236—clearance; 237—sealing structure; 24—first adapter; 25—second adapter; 200—controller; 300—motor; 2000—device for manufacturing a battery cell; 2100—providing apparatus; 2200—mounting apparatus; A—first direction; B—second direction; C—third direction.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", and "third" are merely intended for descriptive purposes, but are not intended to indicate or imply order of precedence. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

"A plurality of" referred to in this application means two or more (including two).

In this application, a battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in a cylindrical shape, a flat shape, a cuboidal shape, or other shapes, without being limited in embodiments of this application. Depending on the form of packaging, the battery cell is typically classed into three types: cylindrical battery cell, prismatic battery cell, and pouch-type battery cell, without being limited in embodiments of this application.

The battery mentioned in embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by relying on shuttling of metal ions between the positive electrode plate and the negative electrode plate. The positive electrode plate includes a positive current collector and a positive active material layer. A surface of the positive current collector is coated with the positive active material layer. Of the positive current collector, a part uncoated with the positive active material layer protrudes from a part coated with the positive active material layer. The part, uncoated with the positive active material layer, of the positive current collector, serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. A surface of the negative current collector is coated with the negative active material layer. Of the negative current collector, a part uncoated with the negative active material layer protrudes from a part coated with the negative active material layer. The part, uncoated with the negative active material layer, of the negative current collector, serves as a negative tab. The negative current collector may be made of copper, and a negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together. The separator may be made of a material such as polypropylene (PP) or polyethylene (PE). In addition, the electrode assembly may be a jelly-roll structure or a stacked structure, without being limited herein.

The development of the battery technology needs to allow for a plurality of design factors, including performance parameters such as energy density, cycle life, discharge capacity, charge rate, and discharge rate, and also needs to ensure safety of the battery.

For a battery cell, main safety hazards come from a charging process and a discharging process. In addition, appropriate ambient temperature design is required. To effectively avoid unnecessary losses, a battery cell is generally protected by three protective measures. Specifically, the protective measures include at least a switch element, an appropriate separator material selected, and a pressure relief mechanism. The switch element is an element that, when a temperature or resistance in the battery cell reaches a given threshold, causes the battery to stop charging or discharging. The separator is configured to separate the positive electrode plate from the negative electrode plate, and, when the temperature rises to a given value, automatically melt micron-scale (or even nanometer-scale) micropores attached to the separator, so as to prevent metal ions from passing through the separator and terminate internal reactions of the battery cell.

The pressure relief mechanism means an element or component that is actuated to relieve an internal pressure or temperature when the internal pressure or temperature of a battery cell reaches a preset threshold. The threshold may vary depending on design requirements. The threshold may depend on the material of one or more of the positive electrode plate, the negative electrode plate, the electrolytic solution, or the separator in the battery cell.

The term "actuated" mentioned in this application means that the pressure relief mechanism performs an action or is activated to a given state so that the internal pressure and temperature of the battery cell is relieved. The actions performed by the pressure relief mechanism may include, but are not limited to rupturing, shattering, tearing, or opening at least a part of the pressure relief mechanism, or the like. When the pressure relief mechanism is actuated, high-temperature and high-pressure substances inside the battery cell are expelled as emissions out of the actuated position. In this way, the pressure and temperature of the battery cell are relieved controllably to avoid potential severer accidents.

The emissions out of the battery cell mentioned in this application include but are not limited to: electrolytic solution, melted or split positive and negative electrode plates, fragments of the separator, reaction-induced high-temperature and high-pressure gases, flames, and the like.

The pressure relief mechanism on a battery cell plays an important role in battery safety. For example, in a case of a short circuit, overcharge, or the like, thermal runaway may occur inside the battery cell, resulting in a surge in pressure or temperature. In this case, the internal pressure and heat can be released outward by actuating the pressure relief mechanism, thereby preventing explosion and fire of the battery cell.

The inventor finds that in a battery cell, the pressure relief mechanism is generally an explosion-proof valve. Gas inside the battery cell acts on the explosion-proof valve for a long time, thereby giving rise to stress fatigue of the explosion-proof valve and shortening the service life of the explosion-proof valve. In addition, in order to analyze the components of the emissions of the battery cell, a storage space is reserved on the explosion-proof valve. From the storage space, the emissions inside the battery cell can be collected for analysis. However, the storage space occupies the internal space of the battery cell, and in turn, impairs the energy density of the battery cell.

In view of this, an embodiment of this application provides a technical solution to replace the existing explosion-proof valve on the battery cell. The technical solution not only provides two pressure relief states, but also releases pressure rapidly when the internal pressure or temperature of the battery cell is relatively high, thereby improving the pressure relief capability, and ensuring the safety performance of the battery cell. The pressure relief rate of the pressure relief mechanism varies with the internal pressure or temperature of the battery cell, thereby ensuring the internal pressure of the battery cell to be constant at all times. In addition, the pressure relief mechanism does not need to reserve a gas storage space. Therefore, the pressure relief mechanism is prevented from occupying an internal space of the battery cell, and it is avoided that the pressure relief mechanism affects the energy density of the battery cell.

The technical solutions described in this embodiment of this application are applicable to a battery and an electrical device that uses the battery.

The electrical device may be a vehicle, a mobile phone, a portable device, a notebook computer, a ship, a spacecraft, an electric toy, a power tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. The electrical device is not particularly limited in embodiments of this application.

For ease of description in the following embodiments, a vehicle is used as an example of the electrical device.

Referring to FIG. 1, FIG. 1 is a schematic structural diagram of a vehicle 1000 according to some embodiments of this application. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000.

The vehicle 1000 may further include a controller 200 and a motor 300. The controller 200 is configured to control the battery 100 to supply power to the motor 300, for example, to start or navigate the vehicle 1000, or meet the operating power requirements of the vehicle in operation.

In some embodiments of this application, the battery 100 serves not only as an operating power supply of the vehicle 1000, but may also serve as a drive power supply of the vehicle 1000 to provide driving power for the vehicle 1000 in place of or partly in place of oil or natural gas.

Figure 2:
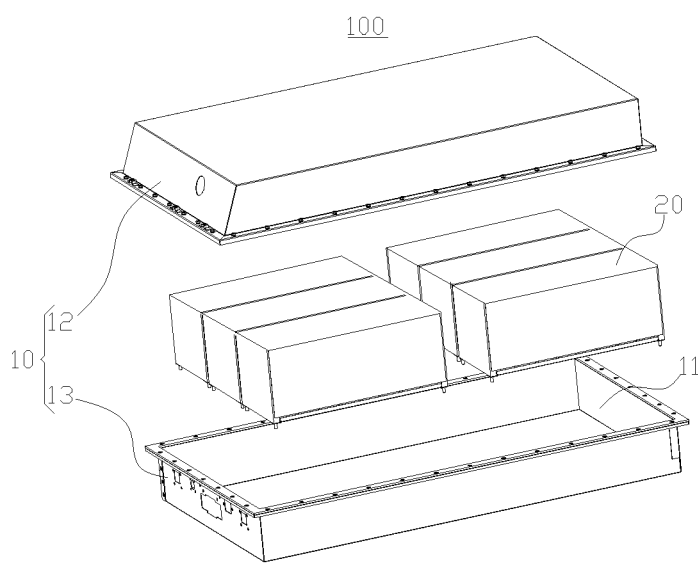
FIG. 2 is a schematic structural diagram of a battery according to some embodiments of this application.

Referring to FIG. 2, FIG. 2 is a schematic structural diagram of a battery 100 according to some embodiments of this application. The battery 100 includes a box 10 and a battery cell 20. The battery cell 20 is accommodated in the box 10.

The box 10 is configured to provide an accommodation space 11 for the battery cell 20. In some embodiments, the box 10 may include a first part 12 and a second part 13. The first part 12 and the second part 13 fit and cover each other to define the accommodation space 11 configured to accommodate the battery cell 20. Definitely, a junction between the first part 12 and the second part 13 may be sealed by a sealing element (not shown in the drawing). The sealing element may be a sealing ring, a sealant, or the like.

The first part 12 and the second part 13 may be in various shapes, such as a cuboid or cylinder. The first part 12 may be a hollow structure opened at one side. The second part 13 may also be a hollow structure opened at one side. The opening side of the second part 13 fits and covers the opening side of the first part 12 to form the box 10 that contains the accommodation space 11. Alternatively, as shown in FIG. 2, the first part 12 is a hollow structure opened at one side, and the second part 13 is a plate-like structure. The second part 13 fits and covers the opening side of the first part 12 to form the box 10 that contains the accommodation space 11.

There may be one or more battery cells 20 in the battery 100. If there are a plurality of battery cells 20, the plurality of battery cells 20 may be connected in series, parallel, or series-and-parallel pattern. The series-and-parallel pattern means a combination of series connection and parallel connection of the plurality of battery cells 20. The plurality of battery cells 20 may be directly connected in series, parallel, or series-and-parallel pattern, and then the whole of the plurality of battery cells 20 may be accommodated in the box 10. Alternatively, the plurality of battery cells 20 may be connected in series, parallel, or series-and-parallel pattern to form a battery module first. A plurality of battery modules are then connected in series, parallel, or series-and-parallel pattern to form a whole for being accommodated in the box 10. The battery cell 20 may be in a cylindrical shape, a flat shape, a cuboidal shape, or other shapes. FIG. 2 shows an example in which the battery cell 20 is in a cuboidal shape.

In some embodiments, the battery 100 may further include a busbar component (not shown in the drawing). The plurality of battery cells 20 may be electrically connected by the busbar component, so as to implement series, parallel, or series-and-parallel connection between the plurality of battery cells 20.

Figure 3:
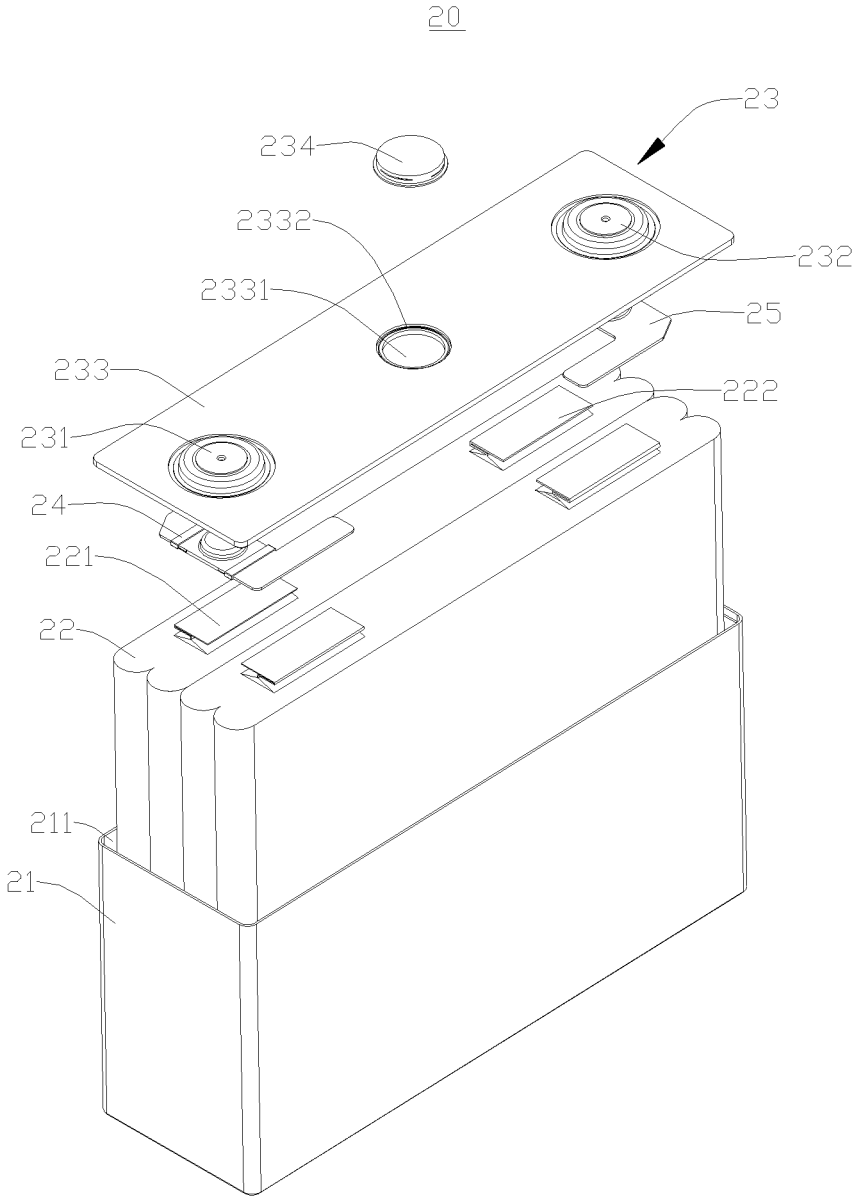
FIG. 3 is an exploded view of a battery cell according to some embodiments of this application.

Referring to FIG. 3, FIG. 3 is an exploded view of a battery cell 20 according to some embodiments of this application. The battery cell 20 may include a shell 21, an electrode assembly 22, and an end cap assembly 23. An opening 211 is made on the shell 21. The electrode assembly 22 is accommodated in the shell 21. The end cap assembly 23 is configured to cover and seal the opening 211.

The shell 21 may be in various shapes such as a cylinder or cuboid. The shape of the shell 21 may be determined depending on the specific shape of the electrode assembly 22. For example, if the electrode assembly 22 is a cylindrical structure, the shell 21 may be a cylindrical structure. If the electrode assembly 22 is a cuboidal structure, the shell 21 may be a cuboidal structure. FIG. 3 shows an example in which the shell 21 is a cuboidal shape and the electrode assembly 22 is a flat shape.

The shell 21 may be made of a variety of materials such as copper, iron, aluminum, stainless steel, or aluminum alloy, without being particularly limited in embodiments of this application.

The electrode assembly 22 may include a positive electrode plate (not shown in the drawing), a negative electrode plate (not shown in the drawing), and a separator (not shown in the drawing). The electrode assembly 22 may be a jelly-roll structure formed by winding the positive electrode plate, the separator, and the negative electrode plate, or a stacked structure formed by stacking the positive electrode plate, the separator, and the negative electrode plate. The electrode assembly 22 further includes a positive tab 221 and a negative tab 222. The part, uncoated with a positive active material layer, of the positive current collector in the positive electrode plate may serve as the positive tab 221, and the part, uncoated with a negative active material layer, of the negative current collector in the negative electrode plate may serve as the negative tab 222.

The end cap assembly 23 is configured to cover and seal the opening 211 of the shell 21 to form an accommodation portion (not shown in the drawing). The accommodation portion is configured to accommodate the electrode assembly 22. The accommodation portion is further configured to accommodate an electrolyte such as an electrolytic solution. The end cap assembly 23 is a component configured to output electrical energy of the electrode assembly 22. Electrode terminals in the end cap assembly 23 are configured to electrically connect to the electrode assembly 22. In some embodiments, the electrode terminals are electrically connected to the tabs by adapters. As shown in FIG. 3, the end cap assembly 23 includes a first electrode terminal 231 and a second electrode terminal 232. The first electrode terminal 231 is electrically connected to the positive tab 221 by a first adapter 24, and the second electrode terminal 232 is electrically connected to the negative tab 222 by a second adapter 25.

It is hereby noted that the number of openings 211 of the shell 21 may be one or two. As shown in FIG. 3, if the number of openings 211 of the shell 21 is one, the number of end cap assemblies 23 may also be one, and two electrode terminals may be disposed in the end cap assembly 23. The two electrode terminals are configured to electrically connect to the positive tab 221 and the negative tab 222 of the electrode assembly 22 respectively. The two electrode terminals in the end cap assembly 23 are a positive electrode terminal and a negative electrode terminal respectively. If there are two openings 211 of the shell 21, for example, if the two openings 211 are disposed on two opposite sides of the shell 21 respectively, the number of end cap assemblies 23 may also be two. The two end cap assemblies 23 fit and cover the two openings 211 of the shell 21 respectively. In this case, the electrode terminal in one end cap assembly 23 may be a positive electrode terminal and configured to electrically connect to the positive tab 221 of the electrode assembly 22; and the electrode terminal in the other end cap assembly 23 may be a negative electrode terminal and configured to electrically connect to the negative tab 222 of the electrode assembly 22.

Figure 4:
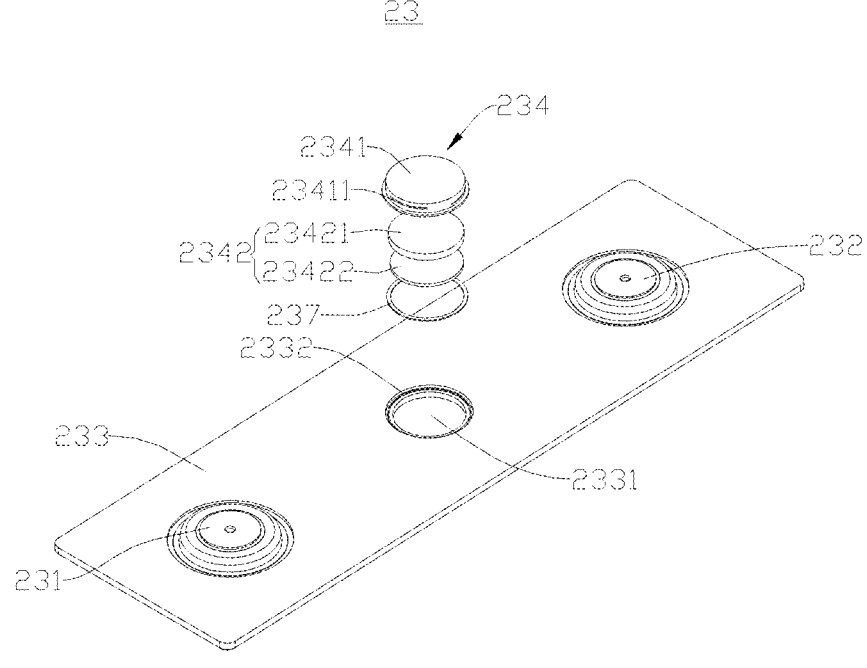
FIG. 4 is an exploded view of an end cap assembly according to some embodiments of this application.
Figure 5:
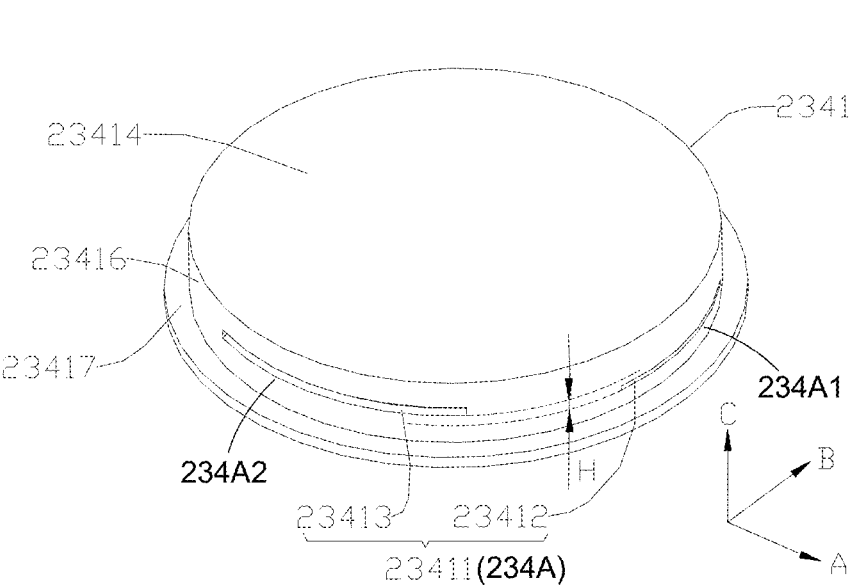
FIG. 5 is a schematic structural diagram of a pressure relief mechanism according to some embodiments of this application.

Refer to FIG. 4 and FIG. 5. FIG. 4 is an exploded view of an end cap assembly 23 according to some embodiments of this application; and FIG. 5 is a schematic structural diagram of a pressure relief mechanism 234 according to some embodiments of this application. The end cap assembly 23 includes an end cap 233 and a pressure relief mechanism 234.

An exhaust hole 2331 is disposed on the end cap 233, the pressure relief mechanism 234 is connected to the end cap 233, and the pressure relief mechanism 234 covers the exhaust hole 2331. The emissions inside the battery cell 20 can pass through the exhaust hole 2331, and can be expelled out of the battery cell 20 during the releasing of pressure by the pressure relief mechanism 234.

In some embodiments, the pressure relief mechanism 234 is disposed between the first electrode terminal 231 and the second electrode terminal 232.

The pressure relief mechanism 234 is configured to: keep in a first pressure relief state when an internal pressure or temperature of the battery cell 20 is greater than or equal to a first threshold and less than a second threshold, so as to release the internal pressure of the battery cell 20; and keep in a second pressure relief state when the internal pressure or temperature of the battery cell 20 is greater than or equal to the second threshold, so as to release the internal pressure of the battery cell 20. A pressure relief area 234A of the pressure relief mechanism 234 in the first pressure relief state is smaller than a pressure relief area 234A of the pressure relief mechanism 234 in the second pressure relief state.

The pressure relief mechanism 234 is further configured to: keep in a blocked state when the internal pressure or temperature of the battery cell 20 is less than the first threshold, so as to block the pressure relief port.

The pressure relief mechanism 234 can work in two pressure relief states. The two pressure relief states match different values of internal pressure or temperature of the battery cell 20. The pressure is relieved when the internal pressure or temperature of the battery cell 20 reaches a threshold. Specifically, the pressure relief mechanism 234 releases the internal pressure of the battery cell 20 in the first pressure relief state when the internal pressure or temperature of the battery cell 20 is greater than the first threshold and less than the second threshold, and the pressure relief mechanism 234 releases the internal pressure of the battery cell 20 in the second pressure relief state when the internal pressure or temperature of the battery cell 20 is greater than the second threshold. The pressure relief area in the first pressure relief state is smaller than the pressure relief area in the second pressure relief state, that is, a pressure relief rate in the second pressure relief state is greater than a pressure relief rate in the first pressure relief state. Therefore, the pressure can be released rapidly when the internal pressure or temperature of the battery cell 20 is relatively high, thereby improving the pressure relief capability and ensuring safety performance of the battery cell 20. The pressure relief rate of the pressure relief mechanism 234 varies with the internal pressure or temperature of the battery cell 20, thereby ensuring the internal pressure of the battery cell 20 to be constant at all times. In addition, the pressure relief mechanism 234 does not need to reserve a gas storage space. Therefore, the pressure relief mechanism 234 is prevented from occupying an internal space of the battery cell 20, and it is avoided that the pressure relief mechanism 234 affects the energy density of the battery cell 20.

After the battery cell 20 is thermally runaway, the internal temperature rises, and gas is emitted. Both the temperature rise and the gas emission cause the internal pressure of the battery cell 20 to increase. The pressure relief mechanism 234 may be actuated according to the change in the value of internal temperature or pressure of the battery cell 20 to release the internal pressure of the battery cell 20.

In some embodiments, the pressure relief mechanism 234 is actuated according to the change in the value of internal temperature of the battery cell 20 to release the internal pressure of the battery cell 20. For example, the pressure relief mechanism 234 includes a pressure relief portion (not shown in the drawing). The pressure relief portion includes a first pressure relief portion (not shown in the drawing) made of a first material and a second pressure relief portion (not shown in the drawing) made of a second material. The heat resistance of the first material is lower than that of the second material. The first pressure relief portion and the second pressure relief portion correspond to two pressure relief states respectively. When the internal temperature of the battery cell 20 is greater than the first threshold and less than the second threshold, the first material is fused off by heat so that the first pressure relief portion forms a first through-hole (not shown in the drawing). The pressure relief mechanism 234 is in the first pressure relief state, and releases the internal pressure and emissions of the battery cell 20 by means of the first through-hole. When the internal temperature of the battery cell 20 is greater than the second threshold, the first material is fused off by heat so that first pressure relief portion forms the first through-hole, and the second material is fused off by heat to form a second through-hole (not shown in the drawing). The pressure relief mechanism 234 is in the second pressure relief state, and releases the internal pressure and emissions of the battery cell 20 by means of the first through-hole and the second through-hole.

In some embodiments, the pressure relief mechanism 234 is actuated according to the change in the value of internal temperature of the battery cell 20 and the change in the value of internal pressure of the battery cell 20 caused by gas emission, so as to release the internal pressure of the battery cell 20.

As shown in FIG. 4 and FIG. 5, in some embodiments, the pressure relief mechanism 234 includes a main body 2341 and an opening apparatus 2342. The main body 2341 includes a pressure relief port 23411. The opening apparatus 2342 is configured to open at least a part of the pressure relief port 23411 when the pressure relief mechanism 234 is in the first pressure relief state or the second pressure relief state, so as to release the internal pressure of the battery cell 20 through the pressure relief port 23411. The pressure relief area 234A at the pressure relief port 23411 in the first pressure relief state is smaller than the pressure relief area 234A at the pressure relief port 23411 in the second pressure relief state.

The pressure relief mechanism 234 releases the internal pressure of the battery cell 20 through the pressure relief port 23411. When the pressure relief area at the pressure relief port 23411 in the first pressure relief state is smaller than the pressure relief area at the pressure relief port 23411 in the second pressure relief state, the opening apparatus 2342 can open the pressure relief port 23411 to a degree that varies with the value of internal pressure or temperature of the battery cell 20. In this way, the pressure relief mechanism 234 releases the pressure at different pressure relief rates to ensure that the internal pressure of the battery cell 20 is constant at all times.

In some embodiments, there is one pressure relief port 23411. When the pressure relief mechanism 234 is in a blocked state, the internal pressure or temperature of the battery cell 20 is less than the first threshold, and the pressure relief port 23411 is fully blocked by the opening apparatus 2342. When the internal pressure or temperature of the battery cell 20 is greater than or equal to the first threshold, the opening apparatus 2342 opens at least a part of the pressure relief port 23411, and the internal pressure of the battery cell 20 is released through the pressure relief port 23411. When the internal pressure or temperature of the battery cell 20 is greater than or equal to the first threshold and less than the second threshold, the area by which the pressure relief port 23411 is opened by the opening apparatus 2342 is a first area, and the pressure relief area is the first area. When the internal pressure or temperature of the battery cell 20 is greater than the second threshold, the area by which the pressure relief port 23411 is opened by the opening apparatus 2342 is a second area, and the pressure relief area is the second area. The second area is the first area plus a part opened additionally, so that the first area is smaller than the second area.

As shown in FIG. 5, in some embodiments, the pressure relief port 23411 includes a first pressure relief port 23412 and a second pressure relief port 23413 that are independent of each other. The first pressure relief port 23412 has an area 234A1, the second pressure relief port 23412 has an area 234A2. The first pressure relief port 23412 is opened and the second pressure relief port 23413 is closed when the pressure relief mechanism 234 is in the first pressure relief state, where the pressure relief port 23411 has a pressure relief area 234A that is the area 234A1 of the first pressure relief port 23412. Both the first pressure relief port 23412 and the second pressure relief port 23413 are opened when the pressure relief mechanism 234 is in the second pressure relief state, where the pressure relief port 23411 has a pressure relief area 234A that is a sum of the area 234A1 of the first pressure relief port 23412 and the area 234A2 of the second pressure relief port 23413. The pressure relief mechanism 234 includes the first pressure relief port 23412 and the second pressure relief port 23413 that are independent of each other, thereby avoiding a relatively large area of the pressure relief port 23411 formed at the same position of the main body 2341, and ensuring the structural strength of the pressure relief mechanism 234.

It is hereby noted that, when the pressure relief mechanism 234 is in the first pressure relief state, the first pressure relief port 23412 may be partly opened or fully opened. When the pressure relief mechanism 234 is in the second pressure relief state, the first pressure relief port 23412 is fully opened, and the second pressure relief port 23413 may be partly opened or fully opened.

The area 234A1 of the first pressure relief port 23412 may be equal to the area 234A2 of the second pressure relief port 23413 or not. In some embodiments, the area 234A1 of the first pressure relief port 23412 is smaller than the area 234A2 of the second pressure relief port 23413.

As shown in FIG. 5, the first pressure relief port 23412 is closer to the interior of the battery cell 20 than the second pressure relief port 23413. In a third direction C, a distance between the first pressure relief port 23412 and the second pressure relief port 23413 is H.

The number of first pressure relief ports 23412 may be one or more, and the number of second pressure relief ports 23413 may be one or more. As shown in FIG. 5, the number of first pressure relief ports 23412 is two, and the two first pressure relief ports 23412 are arranged opposite to each other in a first direction A. The number of second pressure relief ports 23413 is two, and the two second pressure relief ports 23413 are arranged opposite to each other in a second direction B. The first direction A, the second direction B, and the third direction C are perpendicular to each other. The third direction C is consistent with a direction of a central axis of the exhaust hole 2331. This structure enables the first pressure relief ports 23412 and the second pressure relief ports 23413 to be evenly distributed on the main body 2341, thereby avoiding a decrease of the structural strength of the main body 2341 caused by concentration of the first pressure relief ports 23412 and the second pressure relief ports 23413.

Alternatively, the first pressure relief ports 23412 and the second pressure relief ports 23413 may be arranged in other manners. In some embodiments, the two first pressure relief ports 23412 are arranged opposite to each other along the first direction A, and the two second pressure relief ports 23413 are arranged opposite to each other along the first direction A, and the first pressure relief ports 23412 are closer to the interior of the battery cell 20 than the second pressure relief ports 23413.

Figure 6:
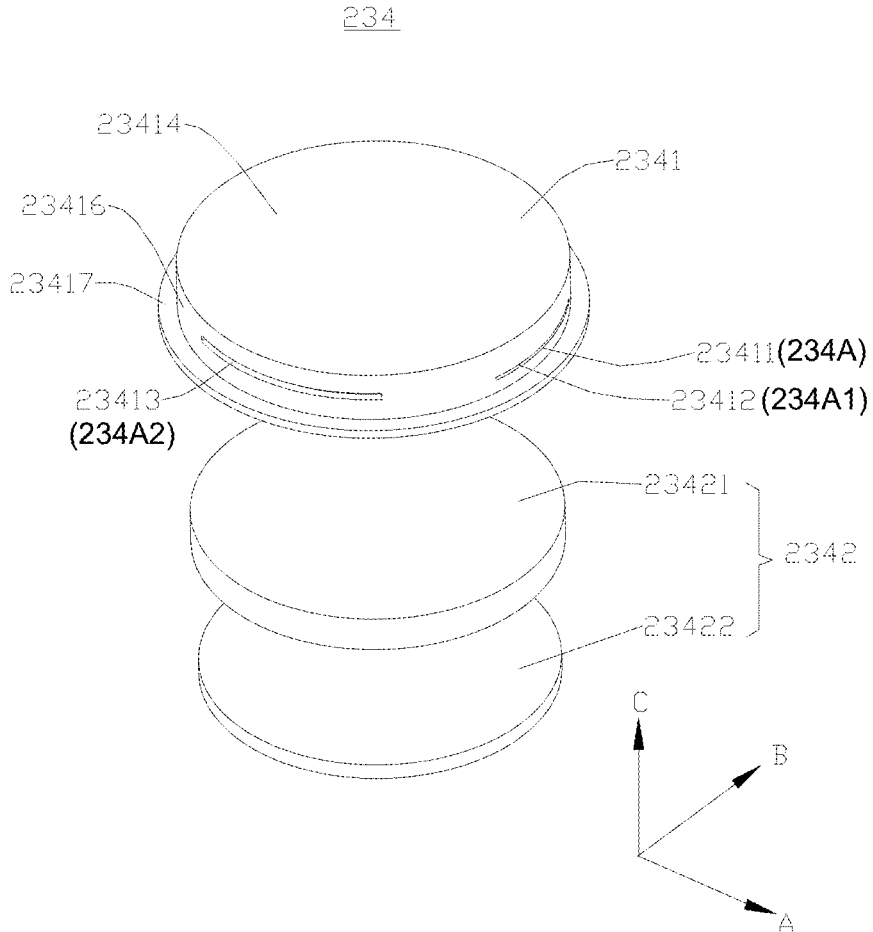
FIG. 6 is an exploded view of a pressure relief mechanism according to some embodiments of this application.

Referring to FIG. 6, FIG. 6 is an exploded view of a pressure relief mechanism 234 according to some embodiments of this application. The opening apparatus 2342 includes a blocking piece 23421. The blocking piece 23421 is connected to the main body 2341. The blocking piece 23421 is configured to be stressed when the internal pressure or temperature of the battery cell 20 is greater than or equal to the first threshold, so as to open at least a part of the pressure relief port 23411.

In some embodiments, the blocking piece 23421 is movably disposed on the main body 2341. When the internal pressure or temperature of the battery cell 20 is greater than or equal to the first threshold, due to a difference between the internal pressure and an external pressure of the battery cell 20, the gas inside the battery cell 20 drives the blocking piece 23421 to move forward to open the pressure relief port 23411. In this structure, when the internal pressure or temperature of the battery 100 is less than the first threshold, another movable element is required to reversely drive the blocking piece 23421 to move to block the pressure relief port 23411, thereby leaving the pressure relief mechanism 234 to be in a blocked state.

In some embodiments, one end of the blocking piece 23421 is fixed against the main body 2341. The blocking piece 23421 opens or blocks the pressure relief port 23411 by way of elastic deformation. The blocking piece 23421 is configured to be compressed under a force when the internal pressure or temperature of the battery cell 20 is greater than or equal to the first threshold, so as to open at least a part of the pressure relief port 23411, and be restored to a former state when the internal pressure of the battery cell 20 is less than the first threshold, so as to block the pressure relief port 23411. Understandably, the blocking piece 23421 is an elastic piece, and can deform to different degrees under a force exerted by the gas inside the battery cell 20, where the degrees of deformation depend on the value of the internal pressure or temperature of the battery cell 20.

The blocking piece 23421 is compressed under a force when the internal pressure or temperature of the battery cell 20 is greater than or equal to the first threshold, so as to open at least a part of the pressure relief port 23411; and is restored to a former state when the internal pressure or temperature of the battery cell 20 is less than the first threshold, so as to block the pressure relief port 23411. In this way, the pressure relief mechanism 234 implements pressure relief and blocking in time. In addition, the elastic blocking piece 23421 can effectively prevent the gas in the battery cell 20 from acting on the pressure relief mechanism 234 for a long time, avoid stress fatigue thereby caused to the pressure relief mechanism, and extend the service life of the pressure relief mechanism 234.

In some embodiments, the blocking piece 23421 is configured to be compressed under a force when the internal pressure or temperature of the battery cell 20 is greater than or equal to the first threshold, so as to open at least a part of the pressure relief port 23411. The first pressure relief port 23412 is closer to the interior of the battery cell 20 than the second pressure relief port 23413. The amount of compression of the blocking piece 23421 varies with the internal pressure or temperature of the battery cell 20. When the amount of compression of the blocking piece 23421 is relatively small, a part or all of just the first pressure relief port 23412 closer to the interior of the battery cell 20 can be opened. When the amount of compression of the blocking piece 23421 increases, the first pressure relief port 23412 can be fully opened and a part or all of the second pressure relief port 23413 farther away from the interior of the battery cell 20 can be opened. In this way, the pressure relief area varies between the two pressure relief states, thereby making it convenient for the pressure relief mechanism 234 to change over between the two pressure relief states.

Figure 7:
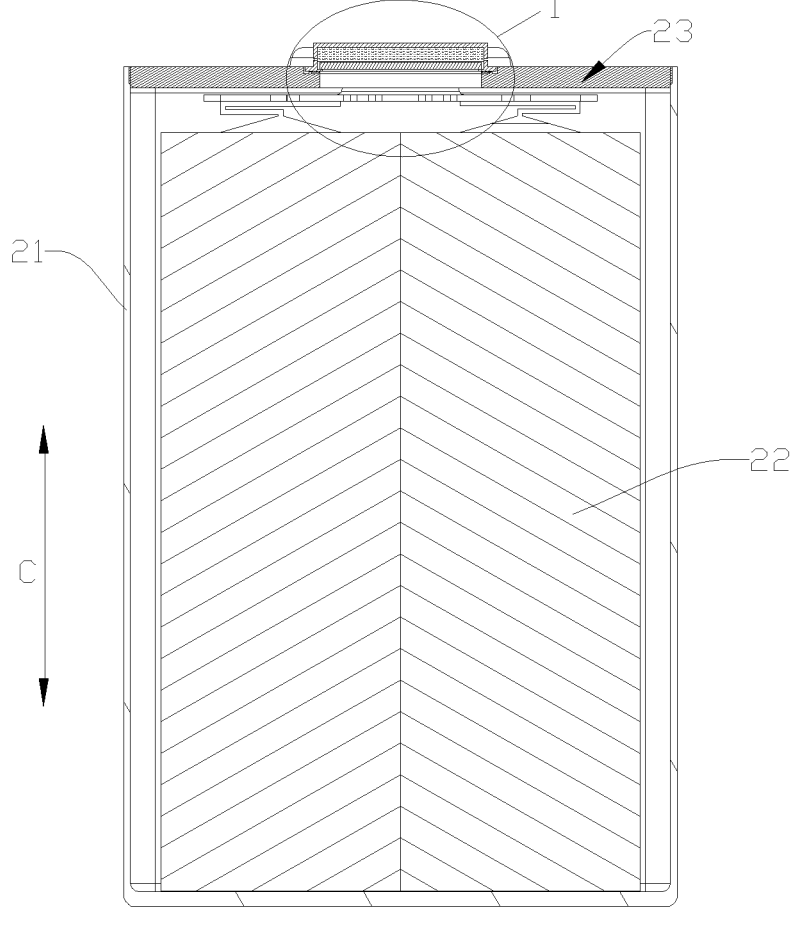
FIG. 7 is a sectional view of a battery cell from a first viewing angle according to some embodiments of this application.
Figure 8:
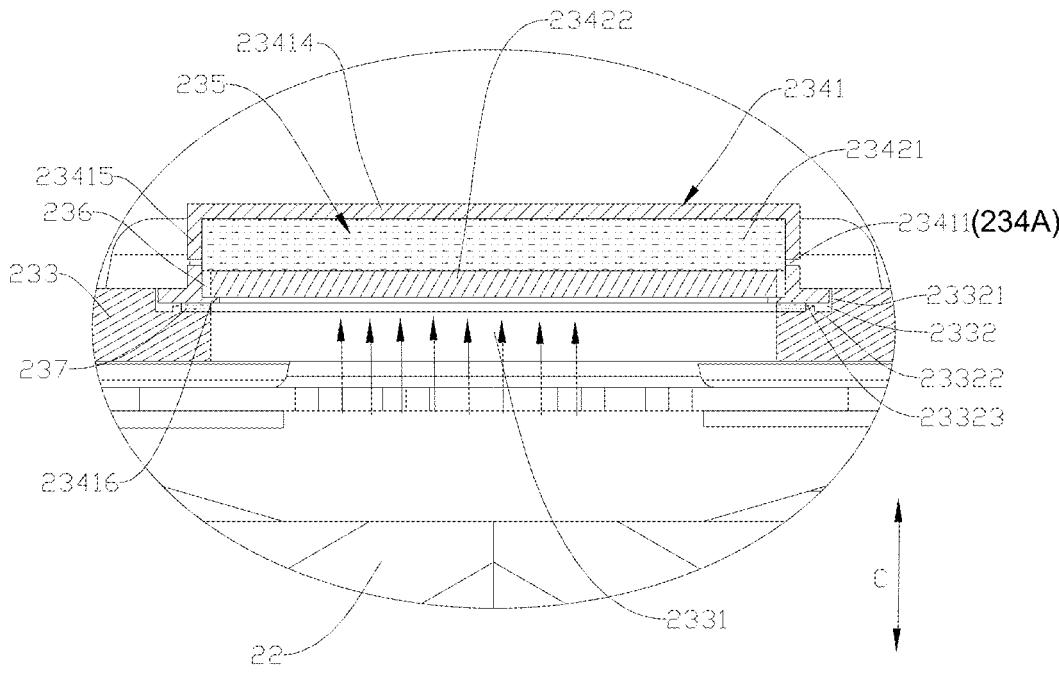
FIG. 8 is a close-up view of a part I shown in FIG. 7.

Referring to FIG. 7 and FIG. 8, FIG. 7 is a sectional view of a battery cell 20 from a first viewing angle according to some embodiments of this application; and FIG. 8 is a close-up view of a part I shown in FIG. 7. The main body 2341 contains an accommodation cavity 235. The blocking piece 23421 fills in the accommodation cavity 235. When the internal pressure or temperature of the battery cell 20 is greater than or equal to the first threshold, the gas in the battery cell 20 provides an extrusion force to the blocking piece 23421. The blocking piece 23421 interacts with the cavity wall of the accommodation cavity 235 so that the pressure relief port 23411 is compressed and opened to release pressure.

In some embodiments, the opening apparatus 2342 further includes an extruding piece 23422. The extruding piece 23422 is movably disposed on the main body 2341. The extruding piece 23422 is configured to move against the main body 2341 when the internal pressure or temperature of the battery cell 20 is greater than or equal to the first threshold, so that the blocking piece 23421 is compressed under a force to open at least a part of the pressure relief port 23411. The blocking piece 23422 is compressed by the movement of the extruding piece 23422 so that the blocking piece 23421 can open the pressure relief port 23411 to release pressure. With the extruding piece 23422 disposed, the blocking piece 23421 can be compressed effectively when the internal pressure or temperature of the battery cell 20 is greater than the first threshold, so as to open the pressure relief port 23411 to release pressure. In addition, the blocking piece 23421 is evenly stressed during the compression.

In some embodiments, as shown in FIG. 8, the extruding piece 23422 is a disc structure. In other embodiments, the extruding piece 23422 may be a regular or irregular structure such as a polygon.

In some embodiments, the extruding piece 23422 may be a structure made of a metal sheet such as a steel sheet or a copper sheet, or other materials that are heat-resistant to some extent.

As shown in FIG. 8, in some embodiments, the main body 2341 includes an abutting portion 23414. The extruding piece 23422 is closer to the interior of the battery cell 20 than the abutting portion 23414. The abutting portion 23414 is configured to coordinate with the extruding piece 23422 to extrude the blocking piece 23421 when the internal pressure or temperature of the battery cell 20 is greater than or equal to the first threshold, so that the blocking piece 23421 is compressed under a force to open at least a part of the pressure relief port 23411. The direction of the arrow shown at the exhaust hole 2331 in FIG. 8 is a direction of a force of thrust of the gas inside the battery cell 20, where the force pushes the extruding piece 23422 to move.

The extruding piece 23422 and the abutting portion 23414 are arranged opposite to each other in the third direction C. The abutting portion 23414 is arranged on a side of the blocking piece 23421 back from the interior of the battery cell 20, and always abuts against the blocking piece 23421 tightly. The abutment force between the blocking piece 23421 and the abutting portion 23414 varies with the value of internal pressure or temperature of the battery cell 20.

The abutting portion 23414 and the extruding piece 23422 coordinate to extrude the blocking piece 23421 when the internal pressure or temperature of the battery cell 20 is greater than or equal to the first threshold, so that the blocking piece 23421 is compressed under a force to open at least a part of the pressure relief port 23411; and are restored to a former state when the internal pressure or temperature of the battery cell 20 is less than the first threshold, so as to block the pressure relief port 23411. In this way, the pressure relief mechanism 234 implements pressure relief and blocking in time.

In some embodiments, as shown in FIG. 8, the abutting portion 23414 is a disc structure. The third direction C is consistent with the axial direction of the abutting portion 23414. In other embodiments, the abutting portion 23414 may be a regular or irregular structure such as a polygon.

Figure 9:
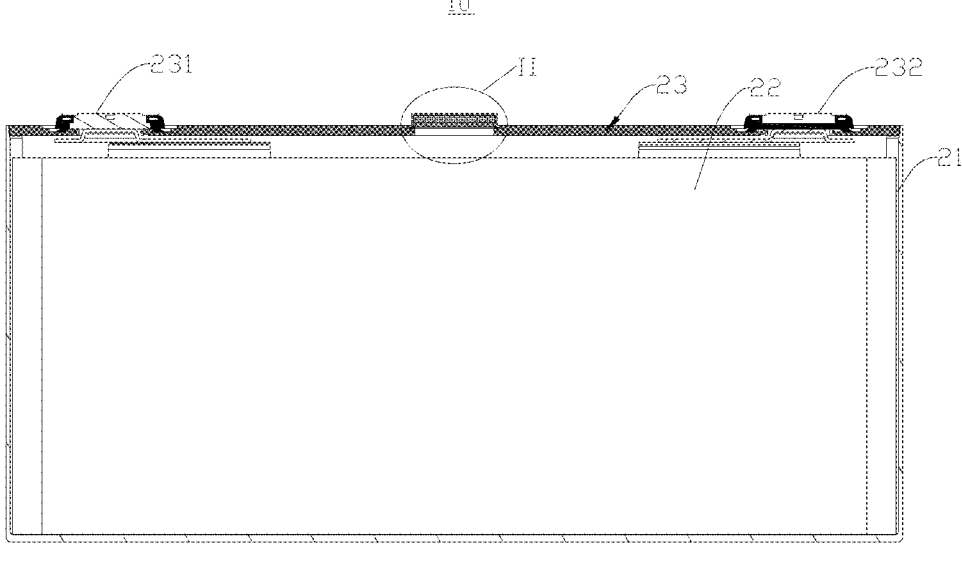
FIG. 9 is a sectional view of a battery cell from a second viewing angle according to some embodiments of this application.
Figure 10:
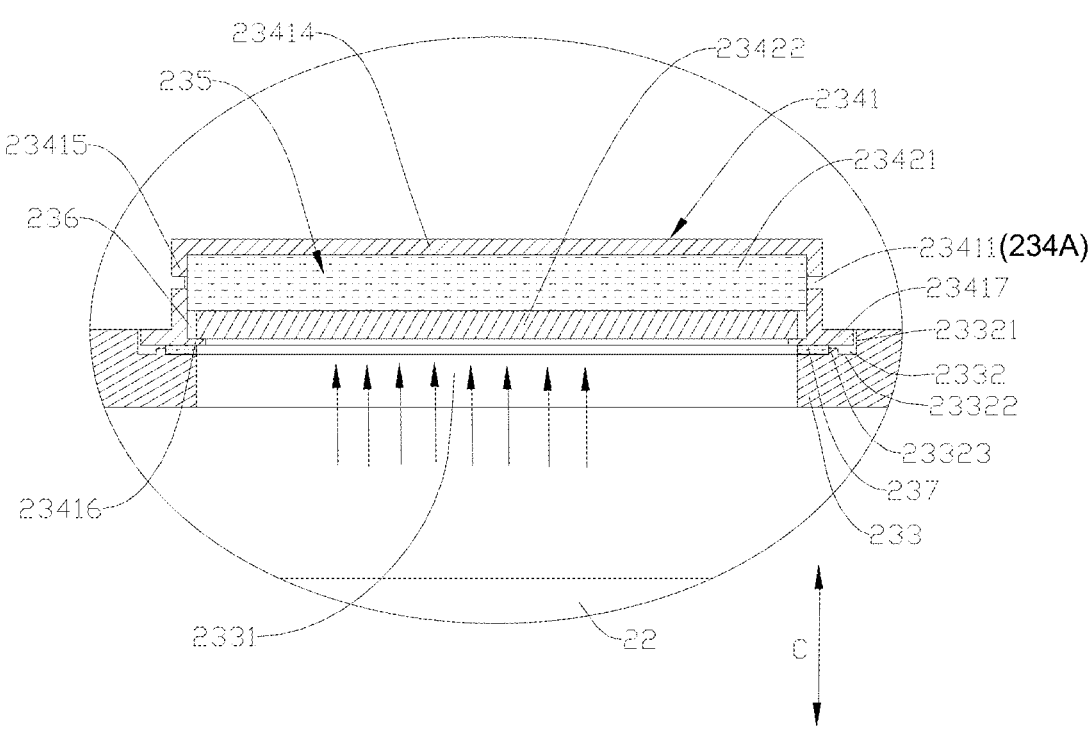
FIG. 10 is a close-up view of a part II shown in FIG. 9.

Referring to FIG. 9 and FIG. 10, FIG. 9 is a sectional view of a battery cell 20 from a second viewing angle according to some embodiments of this application; and FIG. 10 is a close-up view of a part II shown in FIG. 9. In some embodiments, the main body 2341 further includes a position limiting portion 23415. The position limiting portion 23415 is disposed around the abutting portion 23414. The position limiting portion 23415 and the abutting portion 23414 jointly define an accommodation cavity 235. The accommodation cavity 235 is configured to accommodate the extruding piece 23422 and the blocking piece 23421. Because position limiting portion 23415 is disposed around the abutting portion 23414, the abutting portion 23414 and the position limiting portion 23415 jointly define an accommodation cavity 235 of a shape that varies depending on the shape of the abutting portion 23414. For example, when the abutting portion 23414 is a disc structure, the position limiting portion 23415 is a cylindrical structure, and the position limiting portion 23415 and the abutting portion 23414 jointly define a cylindrical accommodation cavity 235. The direction of the arrow shown at the exhaust hole 2331 in FIG. 10 is a direction of a force of thrust of the gas inside the battery cell 20, where the force pushes the extruding piece 23422 to move.

In some embodiments, the pressure relief port 23411 is disposed on the position limiting portion 23415, so that the pressure relief port 23411 is located on a compression path of the blocking piece 23421 so as to be conveniently openable.

When the pressure relief mechanism 234 is in the blocked state, the blocking piece 23421 fills in the accommodation space 11, and the blocking piece 23421 abuts abut against the inner wall of the position limiting portion 23415 and produces an amount of extrusion force to block the pressure relief port 23411. An extrusion force may exist or may not exist between the blocking piece 23421 and the abutting portion 23414, or between the blocking piece 23421 and the extruding piece 23422.

The position limiting portion 23415 and the abutting portion 23414 jointly define the accommodation cavity 235 configured to accommodate the extruding piece 23422 and the blocking piece 23421, thereby preventing the blocking piece 23421 and the extruding piece 23422 from being exposed in an external environment, avoiding wear and tear caused by the external environment to the blocking piece 23421 and the extruding piece 23422, and extending the service life of the blocking piece 23421 and the extruding piece 23422. In addition, because the position limiting portion 23415 is disposed around the abutting portion 23414, the position limiting portion 23415 can further serve a guiding function when the extruding piece 23422 moves in the accommodation cavity 235.

As shown in FIG. 10, in some embodiments, a clearance 236 exists between the inner wall of the position limiting portion 23415 and the outer wall of the extruding piece 23422, thereby avoiding friction between the inner wall of the position limiting portion 23415 and the outer wall of the extruding piece 23422 due to contact. This not only avoids wear and tear of the position limiting portion 23415 and the extruding piece 23422 caused by the friction between the inner wall of the position limiting portion 23415 and the outer wall of the extruding piece 23422, but also reduces a resistance of movement of the extruding piece 23422 against the main body 2341. In this way, when the internal pressure or temperature of the battery cell 20 is greater than or equal to the first threshold, the extruding piece 23422 can move smoothly and compress the blocking piece 23421 to open the pressure relief port 23411 to release pressure. When the internal pressure or temperature of the battery cell 20 is less than the first threshold, the extruding piece can move smoothly and restore the blocking piece 23421 to a former state to block the pressure relief port 23411, thereby ensuring the safety performance of the battery cell 20.

Definitely, depending on actual needs, in some embodiments, the inner wall of the position limiting portion 23415 may be in contact with the outer wall of the extruding piece 23422, so as to prevent the extruding piece 23422 from shaking along a radial direction of the accommodation cavity 235.

In some embodiments, the main body 2341 further includes a position limiting structure 23416. The position limiting structure 23416 is configured to support the extruding piece 23422 so that the extruding piece 23422 is prevented from moving toward the interior of the battery cell 20.

The position limiting structure 23416 is connected to one end of the position limiting portion 23415 back from the abutting portion 23414, and extends toward the center of the accommodation cavity 235. When the pressure relief mechanism 234 is in the blocked state, a side of the position limiting structure 23416 back from the battery cell 20 supports the extruding piece 23422. In fact, the position limiting structure 23416 supports the blocking piece 23421 and the extruding piece 23422 simultaneously. When the battery cell 20 is in the first pressure relief state or the second pressure relief state, the extruding piece 23422 is detached from the position limiting structure 23416 under a force exerted by the gas inside the battery cell 20, so as to coordinate with the abutting portion 23414 to extrude the blocking piece 23421.

The position limiting structure 23416 can provide support for the extruding piece 23422 and keep the extruding piece

23422 in a reasonable position, so as to prevent the extruding piece 23422 from moving excessively toward the battery cell 20 when the internal pressure or temperature of the battery cell 20 is less than the first threshold.

In some embodiments, the extruding piece 23422 is detachably connected to the position limiting structure 23416. For example, the extruding piece 23422 is detachably connected to the position limiting structure 23416 by a riveting structure.

In some embodiments, the position limiting structure 23416 includes a plurality of position limiting blocks spaced out circumferentially along the inner wall of the position limiting portion 23415. Each position limiting block extends toward the central axis of the accommodation cavity 235 along the radial direction of the accommodation cavity 235, thereby reducing the weight of the pressure relief mechanism 234.

In some embodiments, the position limiting structure 23416 is an annular structure, and the annular position limiting structure 23416 serves a function of supporting the extruding piece 23422 more effectively.

Figure 11:
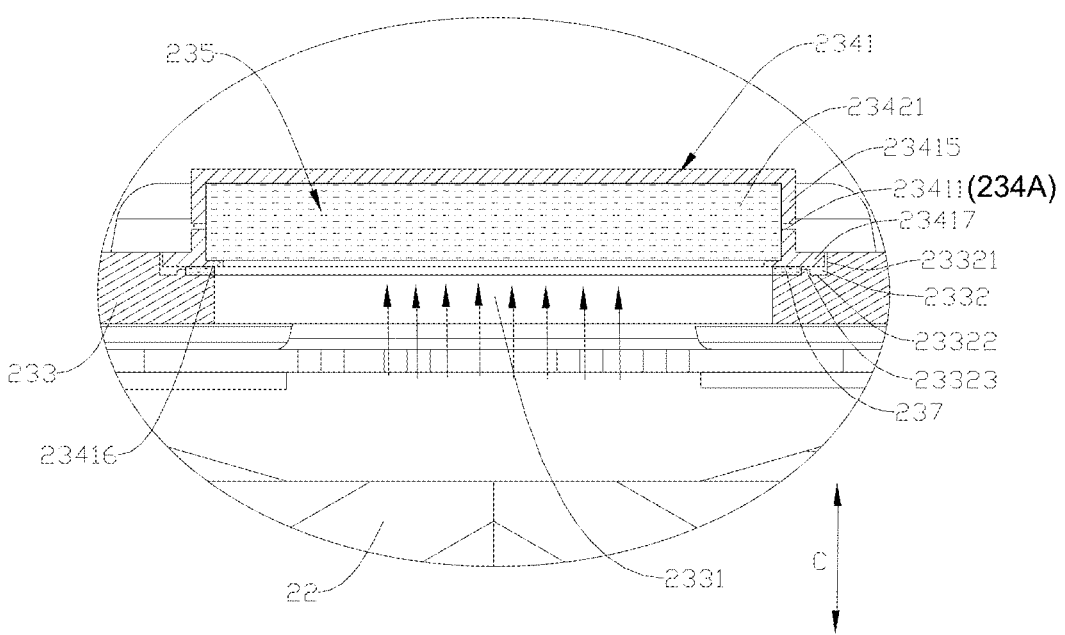
FIG. 11 is a schematic structural diagram of an end cap assembly containing no extruding piece according to other embodiments of this application.

Referring to FIG. 11, FIG. 11 is a schematic structural diagram of an end cap assembly 23 containing no extruding piece 23422 according to other embodiments of this application. In some embodiments, the opening apparatus 2342 may contain no extruding piece 23422, and the gas inside the battery cell 20 directly acts on a side of the blocking piece 23421 toward the interior of the battery cell 20. The direction of the arrow shown at the exhaust hole 2331 in FIG. 11 is a direction of a force of thrust of the gas inside the battery cell 20, where the force pushes and compresses the blocking piece 23421.

As shown in FIG. 11, in some embodiments, the pressure relief mechanism 234 contains no extruding piece 23422. When the pressure relief mechanism 234 is in the blocked state, the position limiting structure 23416 supports the blocking piece 23421, thereby preventing the blocking piece 23421 from detaching from the accommodation cavity 235 and from entering the interior of the battery cell 20.

Figure 12:
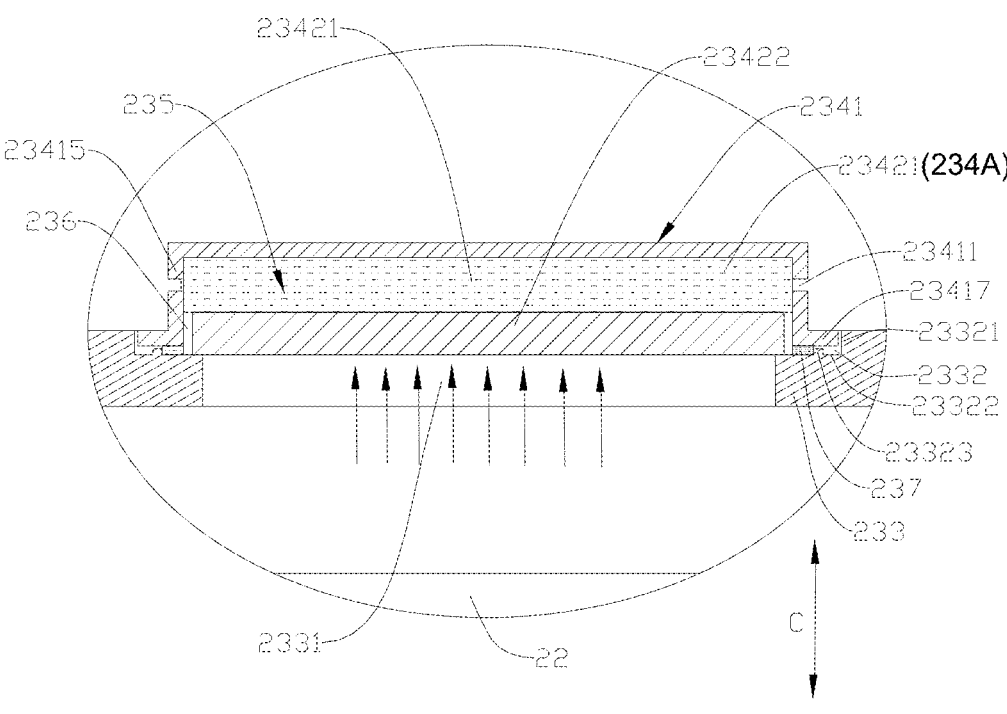
FIG. 12 is a schematic structural diagram of an end cap assembly containing no position limiting structure according to other embodiments of this application.

Referring to FIG. 12, FIG. 12 is a schematic structural diagram of an end cap assembly 23 containing no position limiting structure 23416 according to other embodiments of this application. In other embodiments, the main body 2341 may contain no position limiting structure 23416, and the extruding piece 23422 or the blocking piece 23421 is supported by the end cap 233. When the pressure relief mechanism 234 is in the blocked state, the side of the end cap 233 back from the interior of the battery cell 20 supports the extruding piece 23422 or the blocking piece 23421. FIG. 12 is a schematic structural diagram of the end cap 233 supporting the extruding piece 23422. The direction of the arrow shown at the exhaust hole 2331 in FIG. 12 is a direction of a force of thrust of the gas inside the battery cell 20, where the force pushes the extruding piece 23422 to move.

As shown in FIG. 12, in some embodiments, the blocking piece 23421 is a solid gasket, and the blocking piece 23421 fills in a part of the accommodation cavity 235 between the extruding piece 23422 and the abutting portion 23414. The solid-structured blocking piece 23421 can provide a stable abutment force against the inner wall of the position limiting portion 23415 along the radial direction of the accommodation cavity 235. In this way, the blocking piece 23421 is highly effective in blocking the pressure relief port 23411 when the internal pressure or temperature of the battery cell 20 is less than the first threshold.

Figure 13:
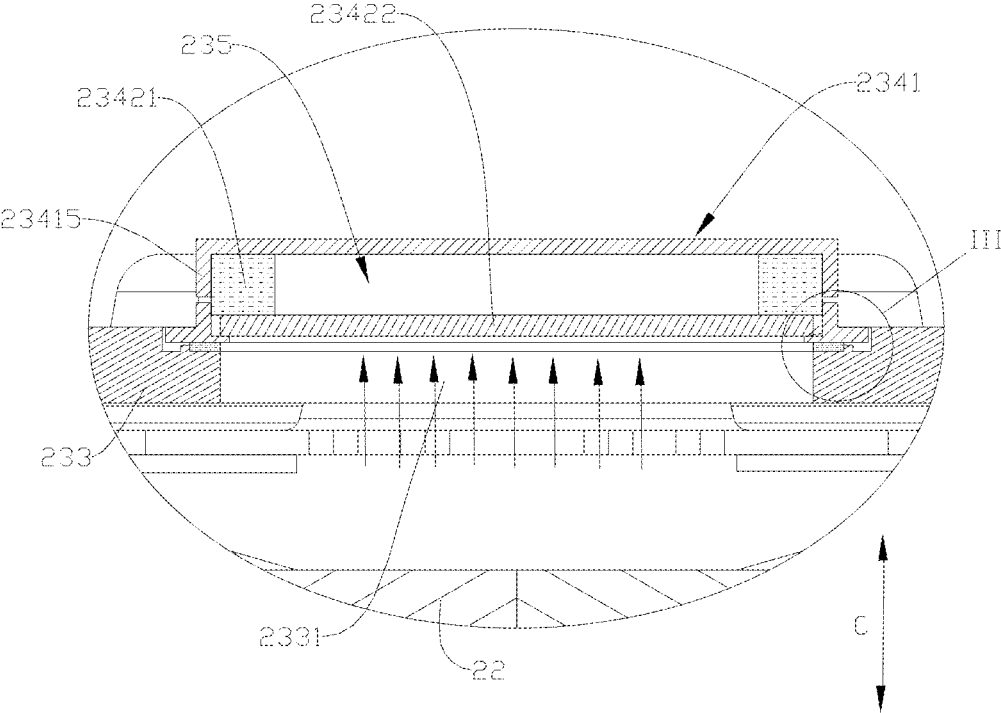
FIG. 13 is a schematic structural diagram of a blocking piece shaped as an annular structure according to other embodiments of this application.

Referring to FIG. 13, FIG. 13 is a schematic structural diagram of a blocking piece 23421 shaped as an annular structure according to other embodiments of this application. In some embodiments, the blocking piece 23421 may be an annular structure such as a sealing ring, thereby reducing the weight of the pressure relief mechanism 234, and in turn, reducing the weight of the battery cell 20. The direction of the arrow shown at the exhaust hole 2331 in FIG. 13 is a direction of a force of thrust of the gas inside the battery cell 20, where the force pushes the extruding piece 23422 to move.

Figure 14:
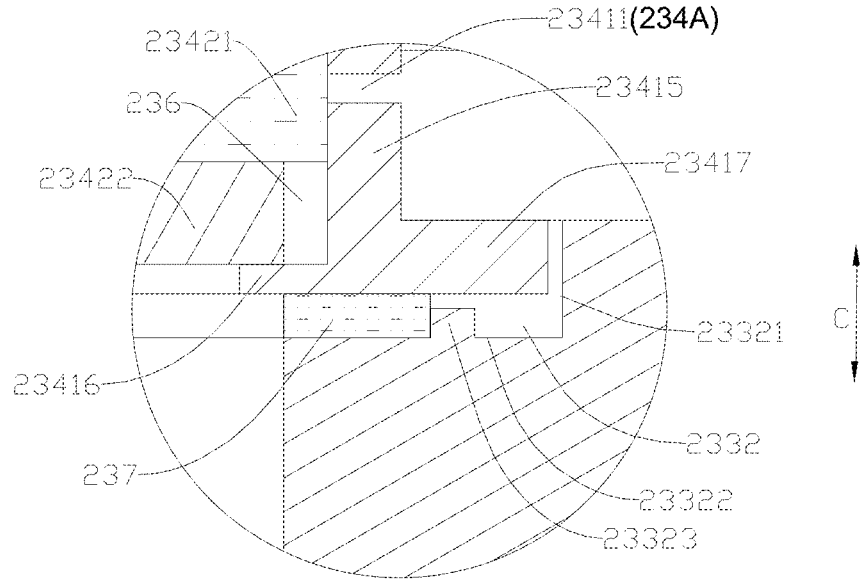
FIG. 14 is a close-up view of a part III shown in FIG. 13.

Referring FIG. 14, in some embodiments, the main body 2341 further includes a connecting portion 23417. The connecting portion 23417 is connected to the position limiting portion 23415, and extends back from the accommodation cavity 235. The connecting portion 23417 is configured to connect to the end cap 233 so as to mount the pressure relief mechanism 234 onto the end cap 233.

As shown in FIG. 14, in some embodiments, a surface of the connecting portion 23417 toward the interior of the battery cell 20 is connected to a surface of the position limiting structure 23416 toward the interior of the battery cell 20, and the two surfaces are located on the same plane. The pressure relief mechanism 234 is located outside the battery cell 20, without occupying the internal space of the battery cell 20 or affecting the energy density of the battery cell 20.

It is hereby noted that the interior of the battery cell in this application means an accommodation portion configured to accommodate the electrode assembly 22 and defined by the shell 21 (refer to FIG. 3) and the side of the end cap 233 toward the electrode assembly 22. The outside of the battery cell means a space other than the accommodation portion.

The connecting portion 23417 may be connected to the end cap 233 in many ways. For example, in some embodiments, the connecting portion 23417 is welded to the end cap 233, or the connecting portion 23417 is connected to the end cap 233 by a screw or bolt.

In some embodiments, the end cap 233 includes a recessed portion 2332 that is recessed toward the interior of the battery cell 20. The recessed portion 2332 is configured to accommodate at least a part of the pressure relief mechanism 234. The recessed portion 2332 that accommodates at least a part of the pressure relief mechanism 234 can reduce the structural size of the battery cell 20 and reduce space occupation of the battery cell 20.

In some embodiments, the connecting portion 23417 of the main body 2341 is located in the recessed portion 2332 and connected to the end cap 233. For example, one end of the connecting portion 23417 back from the position limiting portion 23415 may be configured to be welded to a sidewall 23321 of the recessed portion 2332.

In some embodiments, a supporting portion 23323 is disposed on a bottom wall 23322 of the recessed portion 2332. The pressure relief mechanism 234 is located on a side of the supporting portion 23323 back from the interior of the battery cell 20. A slot configured to hold a sealing structure 237 is formed between the side of the connecting portion 23417 toward the interior of the battery cell 20, the supporting portion 23323, and the bottom wall 23322 of the recessed portion 2332, so as to implement hermetic connection between the pressure relief mechanism 234 and the end cap 233. During welding between the end of the connecting portion 23417 back from the position limiting portion 23415 and the sidewall 23321 of the recessed portion 2332, the supporting portion 23323 can serve a function of heat insulation to some extent, thereby reducing damage to the sealing structure 237 and other structures caused by the heat arising from the welding.

In some embodiments, along the radial direction of the accommodation cavity 235, one end of the connecting portion 23417 back from the position limiting portion 23415 and the position limiting portion 23415 are located on two sides of the supporting piece respectively. A distance between the end of the connecting portion 23417 back from the position limiting portion 23415 and the supporting portion 23323 is greater than or equal to a preset distance. In this way, during welding between the end of the connecting portion 23417 back from the position limiting portion 23415 and the sidewall 23321 of the recessed portion 2332, the heat caused by the welding is prevented from damaging the supporting portion 23323 and the sealing structure 237.

Figure 15:
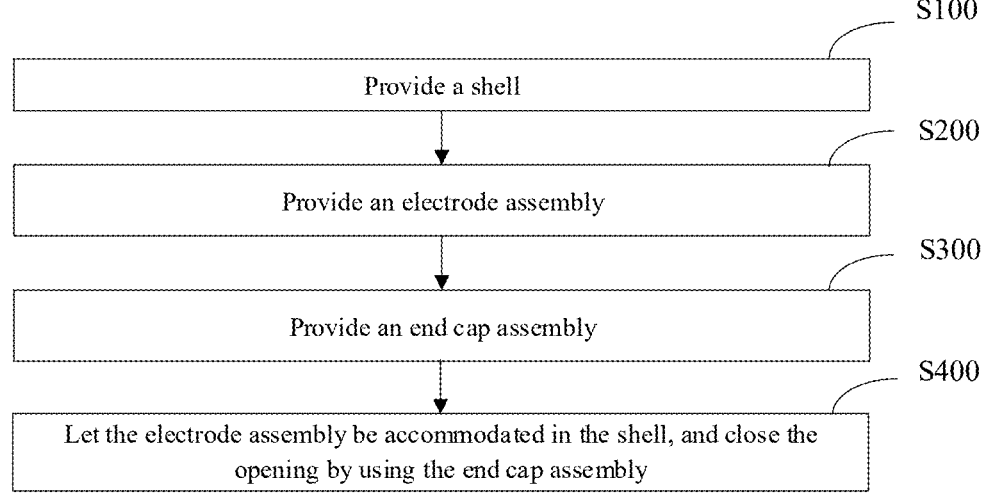
FIG. 15 is a block flowchart of a method for manufacturing a battery cell according to some embodiments of this application.

Referring to FIG. 15, FIG. 15 is a block flowchart of a method for manufacturing a battery cell 20 according to some embodiments of this application. The method for manufacturing a battery cell 20 according to an embodiment of this application includes the following steps:

Step S100: Provide a shell 21, where an opening 211 is made on the shell 21;

Step S200: Provide an electrode assembly;

Step S300: Provide an end cap assembly 23, where the end cap assembly 23 includes: an end cap 233 and a pressure relief mechanism 234. The pressure relief mechanism 234 is connected to the end cap 233. The pressure relief mechanism 234 is configured to: keep in a first pressure relief state when an internal pressure or temperature of the battery cell 20 is greater than or equal to a first threshold and less than a second threshold, so as to release the internal pressure of the battery cell 20; and keep in a second pressure relief state when the internal pressure or temperature of the battery cell 20 is greater than or equal to the second threshold, so as to release the internal pressure of the battery cell 20. A pressure relief area of the pressure relief mechanism 234 in the first pressure relief state is smaller than a pressure relief area of the pressure relief mechanism 234 in the second pressure relief state; and Step S400: Let the electrode assembly 22 be accommodated in the shell 21, and close the opening 211 by using the end cap assembly 23.

It is hereby noted that the order of performing step S100, step S200, and step S300 is not limited in this embodiment of this application. For example, step S200 may be performed first, step S100 is performed next, and step S300 is performed last. For the related structures of the battery cell 20 manufactured according to the foregoing method for manufacturing a battery cell 20, refer to the descriptions of the battery cell 20 provided in the foregoing embodiments.

Figure 16:
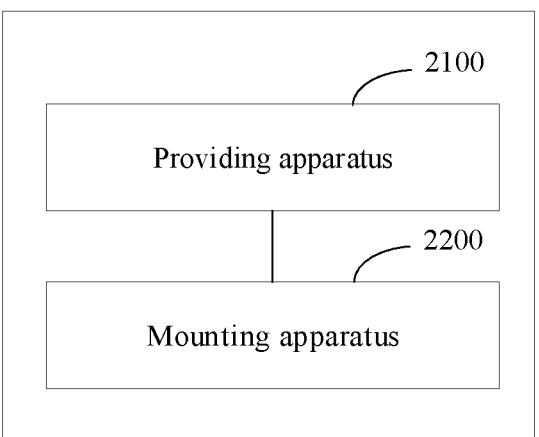
FIG. 16 is a structural block diagram of a device for manufacturing a battery cell according to some embodiments of this application.

Referring to FIG. 16, FIG. 16 is a structural block diagram of a device 2000 for manufacturing a battery cell according to some embodiments of this application. The device 2000 for manufacturing a battery cell according to an embodiment of this application includes a providing apparatus 2100 and a mounting apparatus 2200.

The providing apparatus 2100 is configured to provide a shell 21, an electrode assembly 22, and an end cap 233.

An opening 211 is made on the shell 21.

The end cap assembly 23 includes: an end cap 233 and a pressure relief mechanism 234. The pressure relief mechanism 234 is connected to the end cap 233. The pressure relief mechanism 234 is configured to: keep in a first pressure relief state when an internal pressure or temperature of the battery cell 20 is greater than or equal to a first threshold and less than a second threshold, so as to release the internal pressure of the battery cell 20; and keep in a second pressure relief state when the internal pressure or temperature of the battery cell 20 is greater than or equal to the second threshold, so as to release the internal pressure of the battery cell 20. A pressure relief area of the pressure relief mechanism 234 in the first pressure relief state is smaller than a pressure relief area of the pressure relief mechanism 234 in the second pressure relief state.

The mounting apparatus 2200 is configured to let the electrode assembly 22 be accommodated in the shell 21, and close the opening 211 by using the end cap assembly 23.

Although this application has been described with reference to exemplary embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. An end cap assembly, applicable to a battery cell, and comprising:
   an end cap; and
   a pressure relief mechanism, connected to the end cap, wherein the pressure relief mechanism is configured to:
   keep in a first pressure relief state when an internal pressure or temperature of the battery cell is greater than or equal to a first threshold and less than a second threshold, so as to release the internal pressure of the battery cell; and keep in a second pressure relief state when the internal pressure or temperature of the battery cell is greater than or equal to the second threshold, so as to release the internal pressure of the battery cell, wherein
   the pressure relief mechanism comprises a main body and an opening apparatus,
   the main body comprises a pressure relief port and an abutting portion, the opening apparatus comprises a blocking piece connected to the main body and an extruding piece movably disposed on the main body, the extruding piece is the extruding piece is closer to an interior of the battery cell than the abutting portion,
   when the internal pressure or temperature of the battery cell is greater than or equal to the first threshold, the extruding piece is configured to move against the main body to compress the blocking piece and the abutting portion is configured to coordinate with the extruding piece to extrude the blocking piece, so as to open at least a part of the pressure relief port and to release the internal pressure of the battery cell through the pressure relief port,
   a pressure relief area at the pressure relief port in the first pressure relief state is smaller than a pressure relief area at the pressure relief port in the second pressure relief state.

2. The end cap assembly according to claim 1, wherein the pressure relief port comprises a first pressure relief port and a second pressure relief port that are independent of each other, the first pressure relief port is opened and the second pressure relief port is closed when the pressure relief mechanism is in the first pressure relief state, and both the first pressure relief port and the second pressure relief port are opened when the pressure relief mechanism is in the second pressure relief state.

3. The end cap assembly according to claim 1, wherein the main body further comprises a position limiting portion, the position limiting portion is disposed around the abutting portion, the position limiting portion and the abutting portion jointly define an accommodation cavity, and the accommodation cavity is configured to accommodate the extruding piece and the blocking piece.

4. The end cap assembly according to claim 3, wherein a clearance exists between an inner wall of the position limiting portion and an outer wall of the extruding piece.

5. The end cap assembly according to claim 3, wherein the pressure relief port is disposed in the position limiting portion.

6. The end cap assembly according to claim 1, wherein the main body further comprises a position limiting structure, and the position limiting structure is configured to support the extruding piece so that the extruding piece is prevented from moving toward an interior of the battery cell.

7. The end cap assembly according to claim 6, wherein the position limiting structure is an annular structure.

8. The end cap assembly according to claim 2, wherein the first pressure relief port is closer to an interior of the battery cell than the second pressure relief port.

9. The end cap assembly according to claim 1, wherein the end cap comprises a recessed portion that is recessed toward an interior of the battery cell, and the recessed portion is configured to accommodate at least a part of the pressure relief mechanism.

10. A battery cell, comprising:
    a shell, on which an opening is made;
    an electrode assembly, accommodated in the shell; and
    the end cap assembly according to claim 1, wherein the end cap is configured to fit and cover the opening.

11. A battery, comprising:
    a box; and
    the battery cell according to claim 10, wherein the battery cell is accommodated in the box.

12. An electrical device, comprising the battery cell according to claim 10.

13. An end cap assembly, applicable to a battery cell, comprising:
    an end cap; and
    a pressure relief mechanism, connected to the end cap, wherein the pressure relief mechanism is configured to:
    keep in a first pressure relief state when an internal pressure or temperature of the battery cell is greater than or equal to a first threshold and less than a second threshold, so as to release the internal pressure of the battery cell; and keep in a second pressure relief state when the internal pressure or temperature of the battery cell is greater than or equal to the second threshold, so as to release the internal pressure of the battery cell, wherein
    the pressure relief mechanism comprises a main body and an opening apparatus,
    the main body comprises a pressure relief port and a position limiting structure, the opening apparatus comprises a blocking piece connected to the main body and an extruding piece movably disposed on the main body,
    when the internal pressure or temperature of the battery cell is greater than or equal to the first threshold, the extruding piece is configured to move against the main body to compress the blocking piece, so as to open at least a part of the pressure relief port and to release the internal pressure of the battery cell through the pressure relief port, the position limiting structure is configured to support the extruding piece so that the extruding piece is prevented from moving toward an interior of the battery cell, a pressure relief area at the pressure relief port in the first pressure relief state is smaller than a pressure relief area at the pressure relief port in the second pressure relief state.

14. The end cap assembly according to claim 13, wherein the position limiting structure is an annular structure.

15. The end cap assembly according to claim 13, wherein the pressure relief port comprises a first pressure relief port and a second pressure relief port that are independent of each other, the first pressure relief port is opened and the second pressure relief port is closed when the pressure relief mechanism is in the first pressure relief state, and both the first pressure relief port and the second pressure relief port are opened when the pressure relief mechanism is in the second pressure relief state.

16. The end cap assembly according to claim 15, wherein the first pressure relief port is closer to an interior of the battery cell than the second pressure relief port.

17. The end cap assembly according to claim 13, wherein the end cap comprises a recessed portion that is recessed toward an interior of the battery cell, and the recessed portion is configured to accommodate at least a part of the pressure relief mechanism.

18. A battery cell, comprising:
a shell, on which an opening is made;
an electrode assembly, accommodated in the shell; and
the end cap assembly according to claim 17, wherein the end cap is configured to fit and cover the opening.

19. A battery, comprising:
a box; and
the battery cell according to claim 18, wherein the battery cell is accommodated in the box.

20. An electrical device, comprising the battery cell according to claim 18.

* * * * *